J. HOPKINS.
Animal Pokes.
No. 141,438.  Patented August 5, 1873.
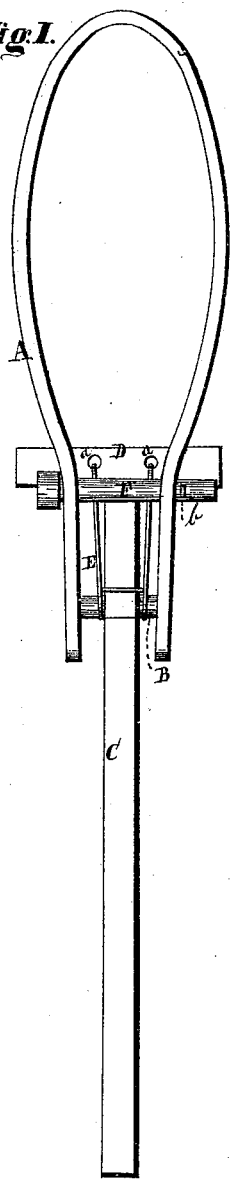
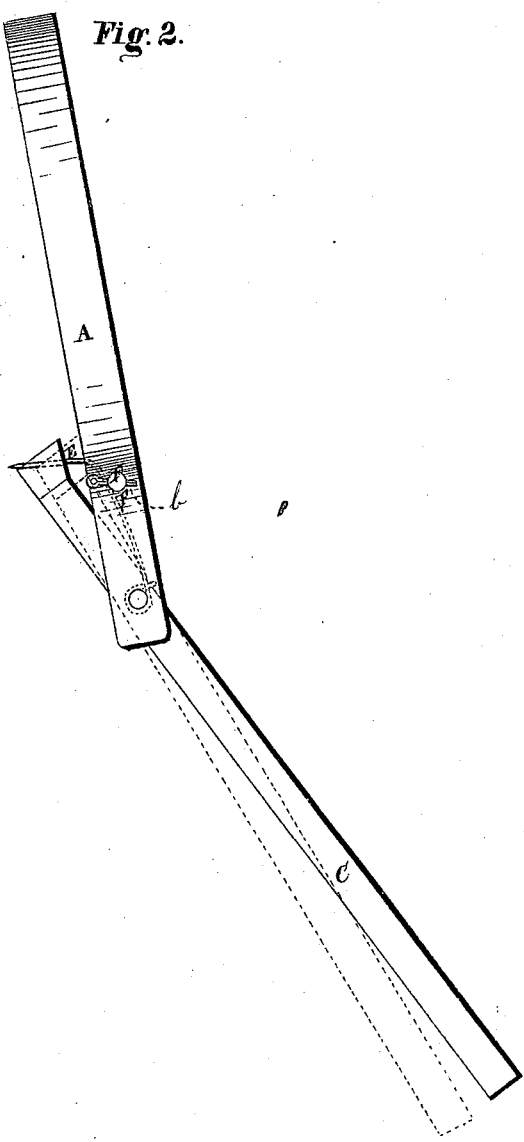
Witnesses.  Inventor.

UNITED STATES PATENT OFFICE.

JAMES HOPKINS, OF AKRON, OHIO.

IMPROVEMENT IN ANIMAL-POKES.

Specification forming part of Letters Patent No. 141,438, dated August 5, 1873; application filed December 6, 1872.

*To all whom it may concern:*

Be it known that I, JAMES HOPKINS, of Akron, in the county of Summit and State of Ohio, have invented a certain new and Improved Animal-Poke; and I do hereby declare that the following is a full, clear, and complete description thereof, reference being had to the accompanying drawings making part of the same.

Figure 1 is a front view of the poke. Fig. 2 is a side view.

Like letters of reference refer to like parts in the several views.

The nature of this invention relates to an animal-poke; and the object thereof is to prevent animals from leaping fences, or from throwing them down.

The construction and operation of said poke are as follows: A is a bow, between the open ends of which is pivoted, by means of the pintle B, a stang, C, provided with a cross-piece or head, D. Around said pintle and stang is wound a spring, E, the two extreme ends of which are bent at right angles, and passed through the head, holes $a$ being made therein for their admission, as shown in Fig. 2. The two ends of the bow are retained on the pintle by means of a bolt, F, which is secured therein by a small pin, $b$.

The above-described poke is secured to the animal by placing the bow around its neck, so that the stang shall extend forward in front, as shown in Fig. 2, in which position, as the animal approaches the fence, the projecting end of the stang will strike against it, and thereby force the ends of the bow down upon the head and press it on the breast of the animal. At the same time the ends of the spring are projected through the head by the bolt F pressing down upon it. The protruding ends of the spring being sharp they pierce the breast of the animal, and thereby cause it to retreat from the fence or wall against which the outer end of the stang comes in contact.

The stang in no way interferes with the freedom of the animal while feeding, as the end of the stang will rest upon the ground, and not cause a protruding of the sharp ends of the spring through the head, but which would be the case did the pressure on the stang come on the upper side of the end thereof by its coming in contact with a fence or wall, as aforesaid.

What I claim as my invention, and desire to secure by Letters Patent, is—

The wire spring E, coiled around the pivotal pin B, and extending back under the bolt or pin F to the stang-head D, through which it is projected by said bow-pin F, in combination with the bow A and stang C, as and for the purpose set forth.

JAMES HOPKINS.

Witnesses:
    J. H. BURRIDGE,
    A. F. CORNELL.